(12) United States Patent
Nusser

(10) Patent No.: US 7,927,384 B2
(45) Date of Patent: Apr. 19, 2011

(54) ACID DYES

(75) Inventor: Rainer Nusser, Neuenburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 218 days.

(21) Appl. No.: 12/305,743

(22) PCT Filed: Jun. 21, 2007

(86) PCT No.: PCT/EP2007/056175
§ 371 (c)(1),
(2), (4) Date: Dec. 19, 2008

(87) PCT Pub. No.: WO2008/000679
PCT Pub. Date: Jan. 3, 2008

(65) Prior Publication Data
US 2010/0233443 A1    Sep. 16, 2010

(30) Foreign Application Priority Data
Jun. 25, 2006 (EP) .................................. 06116014

(51) Int. Cl.
*C09B 35/02* (2006.01)

(52) U.S. Cl. ............. 8/669; 8/662; 8/681; 8/687; 8/917; 8/924; 534/558; 534/561; 534/563; 534/573; 534/579; 534/581; 534/582

(58) Field of Classification Search ............... 8/662, 669, 8/681, 687, 917, 924; 534/558, 561, 563, 534/573, 579, 581, 582
See application file for complete search history.

(56) References Cited

U.S. PATENT DOCUMENTS

| | | | |
|---|---|---|---|
| 4,217,102 A | | 8/1980 | Stingl |
| 4,323,498 A | * | 4/1982 | Benguerel ...................... 534/830 |
| 5,288,294 A | | 2/1994 | Kaser |
| 5,498,701 A | | 3/1996 | Pedrazzi |
| 5,663,309 A | * | 9/1997 | Hurter ........................... 534/763 |
| 6,918,958 B2 | | 7/2005 | Weber et al. |
| 6,926,746 B2 | | 8/2005 | Stumpf |
| 2004/0049863 A1 | | 3/2004 | Stakelbeck et al. |
| 2009/0126128 A1 | | 5/2009 | Nusser et al. |

FOREIGN PATENT DOCUMENTS

| | | |
|---|---|---|
| EP | 0534903 | 3/1993 |
| EP | 0719837 | 7/1996 |
| EP | 0992544 | 4/2000 |
| FR | 2290474 | 6/1976 |
| GB | 17088 | 10/1910 |
| GB | 531292 | 1/1941 |
| GB | 1477084 | 6/1977 |
| WO | WO 94/04613 | 3/1994 |
| WO | WO 02/46318 | 6/2002 |

OTHER PUBLICATIONS

PCT International Search Report for PCT/EP 2007/056175 mailed Jan. 14, 2008.
PCT Written Opinion of the International Searching Authority, for PCT/EP2007/056175, mailed Jan. 14, 2008.
Machine Assisted English Translation of JP 2002-38062, Feb. 6, 2002.
Ullmanns Encyklopedia der technischen Chemie, 4$^{th}$ Edition, vol. 22, pp. 658-673, 1982.
Peter et al., Grundlagen der Textilveredlung 13$^{th}$ Edition; pp. 535-556; 1989.
Peter et al., Grundlagen der Textilveredlung 13$^{th}$ Edition; pp. 566-574, 1989.
English Abstract of JP 2002-398410, Feb. 6, 2002.

* cited by examiner

*Primary Examiner* — Lorna M Douyon
*Assistant Examiner* — Amina Khan
(74) *Attorney, Agent, or Firm* — Anthony A. Bisulca

(57) ABSTRACT

Compounds of the general formula (I)

a process for their preparation and their use for dyeing and/or printing organic substrates are described.

12 Claims, No Drawings

ACID DYES

The invention relates to novel acid dyes, a process for their preparation and their use for dyeing organic substrates.

Acid dyes are known from e.g. EP719837A2. However, there is still a need for acid dyes with improved properties.

The invention provides compounds of the general formula (I)

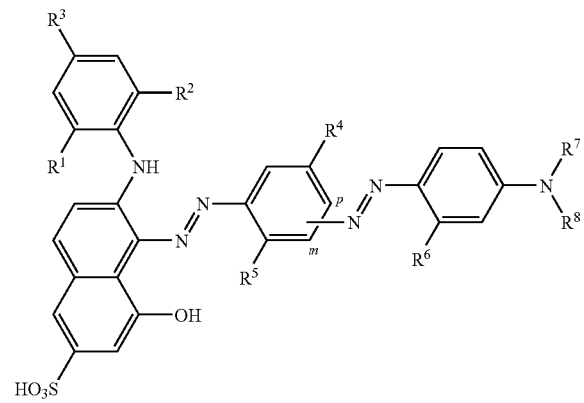

(I)

where
- $R^1$ and $R^2$ are independently unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^3$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^4$ and $R^5$ are independently hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl, or halogen,
- $R^6$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl, or unsubstituted unbranched $C_{1-6}$alkoxy or unsubstituted branched $C_{3-6}$alkoxy or substituted unbranched $C_{1-6}$alkoxy or substituted branched $C_{3-6}$alkoxy, or halogen, or —NHCO—($C_{1-6}$alkyl) with an unbranched $C_{1-6}$alkyl group, which is substituted or unsubstituted, or —NHCO—($C_{3-6}$alkyl) with a branched $C_{3-6}$alkyl group, which is substituted or unsubstituted, or —NHCONH$_2$,
- $R^7$ and $R^8$ are independently unsubstituted unbranched $C_{1-6}$alkyl or unsubstituted branched $C_{3-6}$alkyl or substituted unbranched $C_{1-6}$alkyl or substituted branched $C_{3-6}$alkyl or aryl or —(CH$_2$)$_n$-aryl where n=1, 2, 3 or 4.

In preferred compounds of the general formula (I)
- $R^1$ and $R^2$ are independently unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^3$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^4$ and $R^5$ are independently hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl, or halogen,
- $R^6$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl, or unsubstituted unbranched $C_{1-6}$alkoxy or unsubstituted branched $C_{3-6}$alkoxy or substituted unbranched $C_{1-6}$alkoxy
- $R^7$ unsubstituted unbranched $C_{1-6}$alkyl or unsubstituted branched $C_{3-6}$alkyl or substituted unbranched $C_{1-6}$alkyl or substituted branched $C_{3-6}$alkyl,
- $R^8$ is aryl or —(CH$_2$)$_n$-aryl where n=1, 2, 3 or 4.

The preferred compounds of formula (I) bear at least one anionic substituent, preferably 1 or 2 or 3 anionic substituents, of which 2 anionic substituents are very particularly preferred.

Preferred anionic substituents are carboxyl and/or sulpho groups, and sulpho groups are particularly preferred.

Preferred compounds of the formula (I) preferably have 1, 2 or 3 and more preferably 2 sulpho groups. The preferably 1, 2 or 3 sulpho groups are preferably the further substituents or the substituents on the radicals $R^1$, $R^2$, $R^3$ and/or $R^8$. It is most preferable for the $R^8$ radical to bear a sulpho group.

Aryl is preferably substituted phenyl or substituted naphthyl or unsubstituted phenyl or unsubstituted naphthyl.

Preferably $R^1$ and $R^2$ are independently unsubstituted unbranched $C_{1-6}$alkyl or unsubstituted branched $C_{3-6}$alkyl or substituted unbranched $C_{1-6}$alkyl or substituted branched $C_{3-6}$alkyl or substituted unbranched $C_{1-6}$alkoxy or unsubstituted branched $C_{3-6}$alkoxy or substituted unbranched $C_{1-6}$alkoxy or substituted branched $C_{3-6}$alkoxy. Most preferably, $R^1$ and $R^2$ are independently methyl, ethyl or isopropyl.

Preferably $R^3$ is hydrogen, unsubstituted unbranched $C_{1-6}$alkyl or unsubstituted branched $C_{3-6}$alkyl or substituted unbranched $C_{1-6}$alkyl or substituted branched $C_{3-6}$alkyl or unsubstituted unbranched $C_{1-6}$alkoxy or unsubstituted branched $C_{3-6}$alkoxy or substituted unbranched $C_{1-6}$alkoxy or substituted branched $C_{3-6}$alkoxy. Most preferably $R^3$ is hydrogen, methyl, ethyl or isopropyl, but in particular $R^3$ is hydrogen or methyl.

Preferably $R^4$ and $R^5$ and $R^6$ are independently hydrogen, unsubstituted unbranched $C_{1-6}$alkyl or unsubstituted branched $C_{3-6}$alkyl, or substituted unbranched $C_{1-6}$alkyl or substituted branched $C_{3-6}$alkyl or unsubstituted unbranched $C_{1-6}$alkoxy or unsubstituted branched $C_{3-6}$alkoxy or substituted unbranched $C_{1-6}$alkoxy or substituted branched $C_{3-6}$alkoxy. Most preferably $R^4$ and $R^5$ are each hydrogen or methyl.

Very particular preference is further given to compounds of the formula (I) wherein $R^7$ is unsubstituted unbranched $C_{1-4}$alkyl or unsubstituted branched $C_{3-4}$alkyl or substituted unbranched $C_{1-4}$alkyl or substituted branched $C_{3-4}$alkyl, but in particular hydrogen, methyl or ethyl, of which methyl or ethyl are very particularly preferred. Very particular preference is further given to compounds of the formula (I) wherein $R^8$ is substituted or unsubstituted phenyl or substituted or unsubstituted naphthyl or substituted or unsubstituted —(CH$_2$)$_n$-phenyl or substituted or unsubstituted —(CH$_2$)$_n$-naphthyl where n=1, 2, 3 or 4, of which a —CH$_2$-phenylene group is very particularly preferred. The preferred —CH$_2$-phenylene groups are substituted, preferably by nitro groups and/or sulpho groups, a sulpho group being very particularly preferred as a substituent for the preferred —CH$_2$-phenylene groups.

The branched $C_{3-6}$alkyl groups or unbranched $C_{1-6}$alkyl groups and the unbranched $C_{1-6}$alkoxy groups or branched $C_{3-6}$alkoxy groups can be further substituted with hydroxy groups or cyano groups. Preferably the alkyl groups and/or the alkoxy groups are not further substituted.

In the preferred compounds of the formula (I) the preferred alkyl groups and the preferred alkoxy groups are methyl, ethyl, propyl, methoxy and ethoxy groups. Methyl and ethyl groups are very particularly preferred.

The substituted aryl groups are preferably substituted by nitro or sulpho groups. Particular preference is given to sulpho groups as substituents on the aryl groups.

In the compound of the formula (I) the radical having the formula (I')

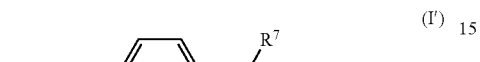

is preferably attached to the radical of the formula (I")

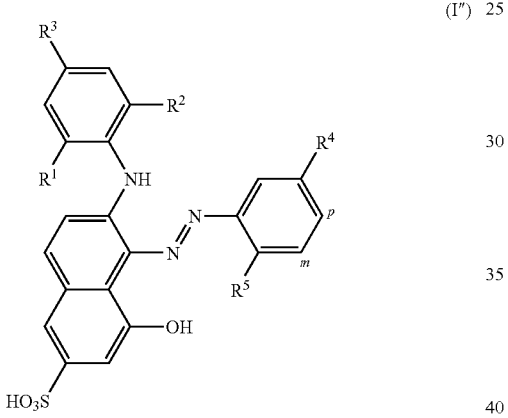

either in position m (meta) or p (para). In very particularly preferred compounds of the formula (I) the radical of the formula (I') is p (para) attached to the radical of the formula (I").

The invention also provides a process for preparing compounds of the formula (I). The present invention's compounds of the formula (I) can be prepared under conventional conditions in conventional processes.

In these processes, compounds of the formula (II)

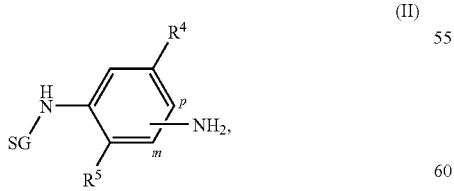

which are known from the literature and in which SG is a protective group such as acetyl for example and the other substituents are each as defined above, are conventionally diazotized and coupled onto one equivalent of a compound of the formula (III)

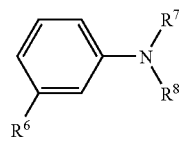

where the substituents are each as defined above and after the protective group SG has been removed (by hydrolysis) the amine of the formula (IV)

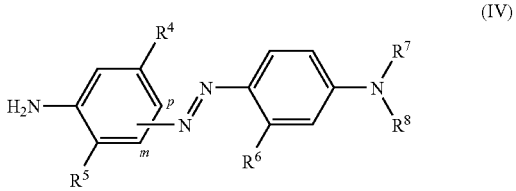

is conventionally diazotized and coupled at acidic pH onto one equivalent of a compound of the formula (V)

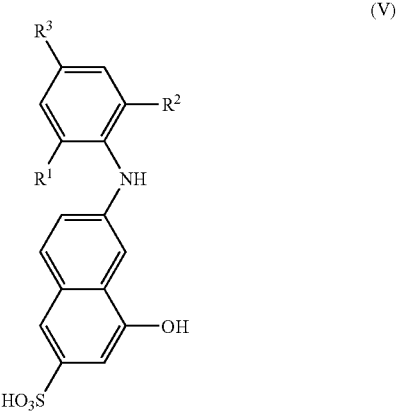

It is similarly possible to proceed by a process wherein first the compound of the formula (II')

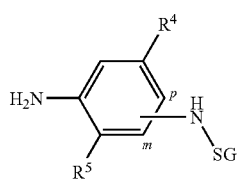

is conventionally diazotized and coupled at acidic pH onto one equivalent of a compound of the formula (V)

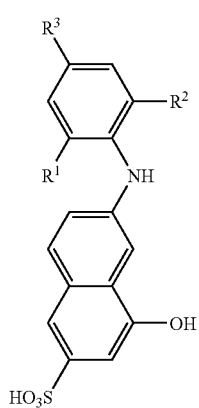
(V)

and after the protective group SG has been removed (by hydrolysis) the amine of the formula (IV')

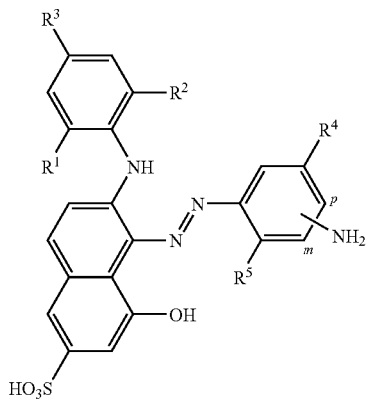
(IV')

is conventionally diazotized and coupled onto one equivalent of a compound of the formula (III)

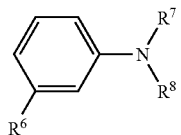
(III)

where the substituents are each as defined above.

The dyes of the formula (I) can be isolated from the reaction medium by conventional processes, for example by salting out with an alkali metal salt, filtering and drying, if appropriate under reduced pressure and at elevated temperature.

Depending on the reaction and/or isolation conditions, the dyes of the formula (I) can be obtained as free acid, as salt or as mixed salt which contains for example one or more cations selected from alkali metal ions, for example the sodium ion, or an ammonium ion or alkylammonium cation, for example mono-, di- or trimethyl- or -ethylammonium cations. The dye can be converted by conventional techniques from the free acid into a salt or into a mixed salt or vice versa or from one salt form into another. If desired, the dyes can be further purified by diafiltration, in which case unwanted salts and synthesis by-products are separated from the crude anionic dye.

The removal of unwanted salts and synthesis by-products and partial removal of water from the crude dye solution is carried out by means of a semipermeable membrane by applying a pressure whereby the dye is obtained without the unwanted salts and synthesis by-products as a solution and if necessary as a solid body in a conventional manner.

The dyes of the formula (I) and their salts are particularly suitable for dyeing or printing fibrous material consisting of natural or synthetic polyamides in yellow to violet shades. The dyes of the formula (I) and their salts are suitable for producing Inkjet printing inks and for using these Inkjet printing inks to print fibrous material which consists of natural or synthetic polyamides or cellulose (paper for example).

The invention accordingly provides from another aspect for the use of the dyes of the formula (I), their salts and mixtures for dyeing and/or printing fibrous materials consisting of natural or synthetic polyamides. A further aspect is the production of Inkjet printing inks and their use for printing fibrous materials consisting of natural or synthetic polyamides.

Dyeing is carried out as per known processes, see for example the dyeing processes described in Ullmanns Encyklopädie der technischen Chemie, 4th Edition, 1982, Volume 22, pages 658-673 or in the book by M. Peter and H. K. Rouette, Grundlagen der Textilveredlung, 13th Edition, 1989, pages 535-556 and 566-574. Preference is given to dyeing in the exhaust process at a temperature of 30 to 140° C., more preferably 80 to 120° C. and most preferably at a temperature of 80 to 100° C., and at a liquor ratio in the range from 3:1 to 40:1.

The substrate to be dyed can be present in the form of yarn, woven fabric, loop-formingly knitted fabric or carpet for example. Fully fashioned dyeings are even permanently possible on delicate substrates, examples being lambswool, cashmere, alpaca and mohair. The dyes of the invention are particularly useful for dyeing fine-denier fibres (microfibres).

The dyes according to the present invention and their salts are highly compatible with known acid dyes. Accordingly, the dyes of the formula (I), their salts or mixtures can be used alone in a dyeing or printing process or else as a component in a combination shade dyeing or printing composition together with other acid dyes of the same class, i.e. with acid dyes possessing comparable dyeing properties, such as for example fastness properties and exhaustion rates from the dyebath onto the substrate. The dyes of the present invention can be used in particular together with certain other dyes having suitable chromophores. The ratio in which the dyes are present in a combination shade dyeing or printing composition is dictated by the hue to be obtained.

The novel dyes of the formula (I), as stated above, are very useful for dyeing natural and synthetic polyamides, i.e. wool, silk and all nylon types, on each of which dyeings having a high fastness level, especially good light fastness and good wet fastnesses (washing, alkaline perspiration) are obtained. The dyes of the formula (I) and their salts have a high rate of exhaustion. The ability of the dyes of the formula (I) and their salt to build up is likewise very good. On-tone dyeings on the identified substrates are of outstanding quality. All dyeings moreover have a constant hue under artificial light. Furthermore, the fastness to decating and boiling is good.

One decisive advantage of the novel dyes is that they are metal free and provide very level dyeings.

The compounds according to the invention can be used as an individual dye or else, owing to their good compatibility, as a combination element with other dyes of the same class having comparable dyeing properties, for example with regard to general fastnesses, exhaustion value, etc. The combination shade dyeings obtained have similar fastnesses to dyeings with the individual dye.

The invention's dyes of the formula (I) can also be used as red components in trichromatic dyeing or printing. Trichromatic dyeing or printing can utilize all customary and known dyeing and printing processes, such as for example the continuous process, exhaustion process, foam dyeing process and Ink-Jet process.

The composition of the individual dye components in the trichromatic dye mixture used in the process of the invention depends on the desired hue. A brown hue for example preferably utilizes 20-40% by weight of a yellow component, 40-60% by weight of the invention's orange or red component and 10-20% by weight of a blue component.

The yellow component, as described above, can consist of a single component or of a mixture of different orange individual components conforming to the formula (I). Preference is given to double and triple combinations.

Particularly preferred red and/or yellow components are described in WO2002/46318.

In the examples which follow, parts and percentages are by weight and temperatures are reported in degrees Celsius.

PREPARATION EXAMPLE 1

15.0 parts of 4-aminoacetanilide were introduced into a mixture of 50 parts of ice and 25 parts by volume of approximately 30% hydrochloric acid and stirred for about 30 min. At 0-5° C. 17.3 parts by volume of a 40% sodium nitrite solution were then added dropwise within 30 min. The temperature was maintained at 0-5° C. during the addition by addition of ice. After the diazotization had ended, excess sodium nitrite was destroyed with aminosulphonic acid.

29.1 parts of 3-[(ethylphenylamino)methyl]benzenesulphonic acid were suspended in 200 parts of water. The suspension was adjusted to pH 7-7.5 with sodium carbonate. The diazo suspension was then added in the course of 30 min with vigorous stirring. During the addition, the pH was maintained at about 7 by metered addition of sodium carbonate solution.

After the coupling reaction had ended, 50 parts by volume of an approximately 30% aqueous sodium hydroxide solution were added and the reaction mixture was heated to 90-100° C. The reaction was monitored by thin layer chromatography. After about 24 h, the deacetylation had ended. The resulting compound of the formula A suspension of 34.4 parts of 2-(2',6'-dimethylphenylamino)-8-hydroxynaphthalene-6-sulphonic acid in 200 parts of water was admixed, at about 20-25° C. and a pH between 1 and 2, with a diazonium salt solution prepared in a conventional manner from 41.0 parts of the aminoazo compound (I) and 17.3 parts by volume of a 40% sodium nitrite solution at 0-5° C. After coupling had ended, the resulting dye of the formula

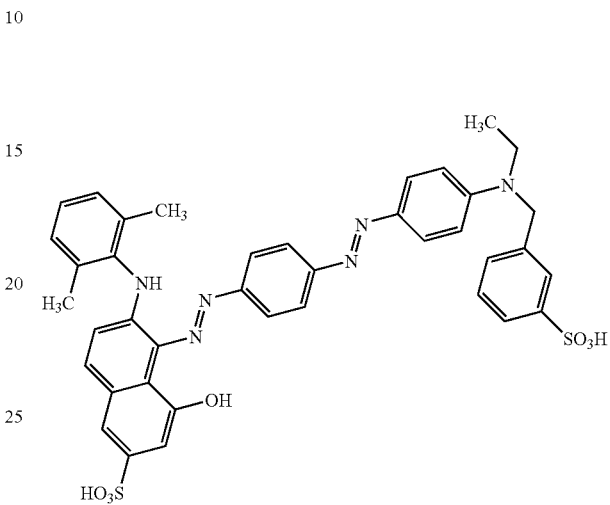

was salted out with sodium chloride, filtered off and dried at 50° C. under reduced pressure. On wool and in particular on polyamide fibres it produces blue dyeings having good light and wet fastness properties (lamda(max)($\lambda_{max}$)=588 nm).

EXAMPLES 2-53

The table which follows contains dyes which can be prepared similarly to the method described in Example 1 by using the corresponding starting materials. These dyes provide blue dyeings having very good light and wet fastnesses on polyamide fibres and wool.

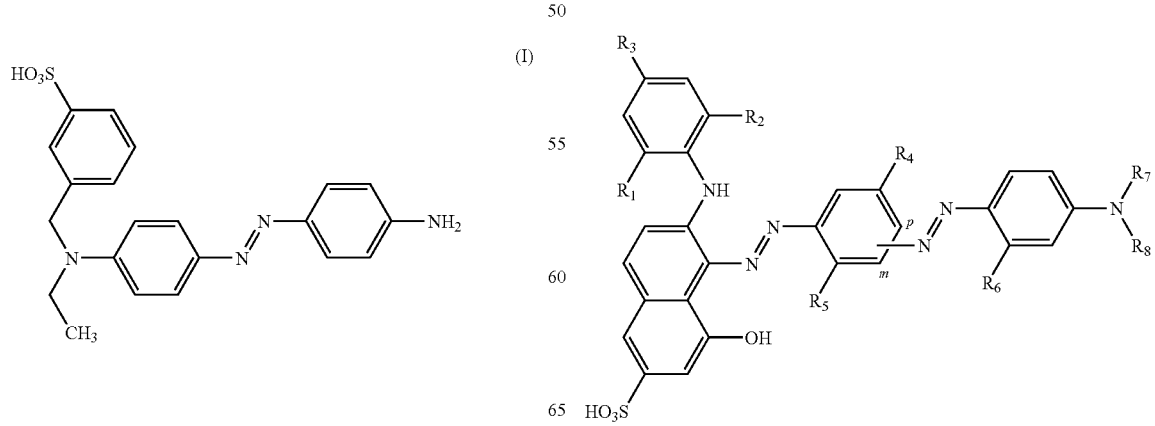

was filtered off.

| Example | R₁ | R₂ | R₃ | R₄ | R₅ | R₆ | R₇ | R₈ | Position | $\lambda_{max}$ |
|---|---|---|---|---|---|---|---|---|---|---|
| 2 | Me | Me | H | H | H | Me | Et | 3-(HO₃S)C₆H₄-CH₂-CH< | p | 592 |
| 3 | Me | Me | H | H | H | Me | Et | 3-(HO₃S)C₆H₄-CH₂-CH< | m | 585 |
| 4 | Me | Me | H | Me | Me | Me | Et | 3-(HO₃S)C₆H₄-CH₂-CH< | p | 596 |
| 5 | Me | Me | H | Me | Me | H | Et | 3-(HO₃S)C₆H₄-CH₂-CH< | p | 594 |
| 6 | Me | Me | H | Me | H | Me | Et | 3-(HO₃S)C₆H₄-CH₂-CH< | p | 591 |
| 7 | Me | Et | H | H | H | Me | Et | 3-(HO₃S)C₆H₄-CH₂-CH< | p | 593 |
| 8 | Me | Et | H | Me | H | H | Et | 3-(HO₃S)C₆H₄-CH₂-CH< | p | 592 |
| 9 | Me | Et | H | Me | Me | Me | Et | 3-(HO₃S)C₆H₄-CH₂-CH< | p | 594 |
| 10 | Me | Et | H | H | H | Me | Et | 3-(HO₃S)C₆H₄-CH₂-CH< | p | 588 |
| 11 | Me | Et | H | Me | Me | Me | Et | 3-(HO₃S)C₆H₄-CH₂-CH< | p | 597 |
| 12 | Me | Et | H | Me | Me | Me | Et | 4-(HO₃S)C₆H₄-CH₂-CH₂- | p | 593 |

-continued
| Example | R₁ | R₂ | R₃ | R₄ | R₅ | R₆ | R₇ | R₈ | Position | λ$_{max}$ |
|---|---|---|---|---|---|---|---|---|---|---|
| 13 | Me | Et | H | H | H | Me | Et | 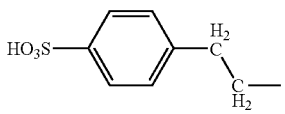 | p | 592 |
| 14 | Me | Et | H | Me | Me | Me | Et | 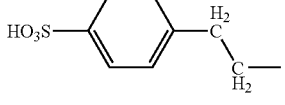 | p | 597 |
| 15 | Me | Et | H | Me | Me | Me | Me | 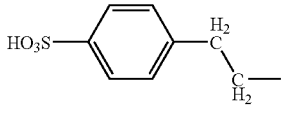 | p | 596 |
| 16 | Me | Me | H | H | H | Me | Et | 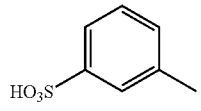 | p | 589 |
| 17 | Me | Me | H | Me | Me | Me | Et | 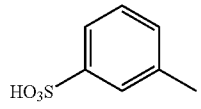 | p | 592 |
| 18 | Me | Me | H | Me | Me | H | Et | 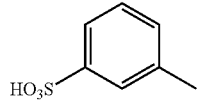 | p | 595 |
| 19 | Me | Et | H | H | H | H | Et | 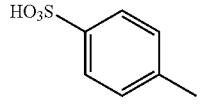 | m | 587 |
| 20 | Me | Et | H | H | H | H | Et | 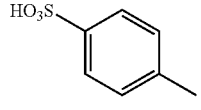 | p | 588 |
| 21 | Me | Et | H | Me | Me | H | Et | 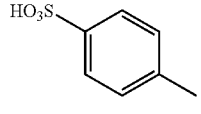 | p | 591 |
| 22 | Me | Et | H | Me | Me | H | Et | 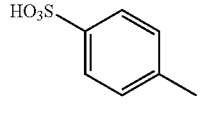 | p | 592 |
| 23 | Me | Et | H | Cl | Cl | H | Et | 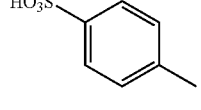 | p | 599 |
| 24 | Me | Et | H | Cl | Cl | Me | Et | 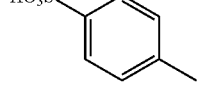 | p | 601 |
| 25 | Et | Et | H | Cl | Me | Me | Et | 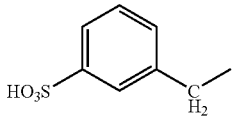 | p | 594 |

-continued
| Example | R₁ | R₂ | R₃ | R₄ | R₅ | R₆ | R₇ | R₈ | Position | $\lambda_{max}$ |
|---|---|---|---|---|---|---|---|---|---|---|
| 26 | Et | Et | H | H | H | Me | Et | 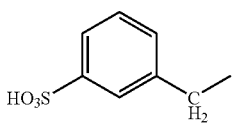 | p | 589 |
| 27 | Et | Et | H | H | H | Me | Et | 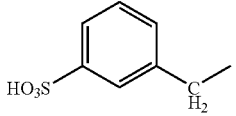 | p | 591 |
| 28 | Et | Et | H | H | H | Me | Et | 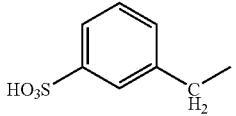 | m | 587 |
| 29 | Me | Me | Me | Me | Me | Me | Et | 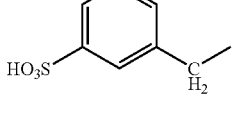 | p | 596 |
| 30 | Me | Me | Me | Me | Me | H | Et | 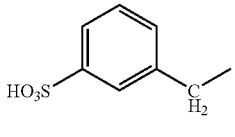 | p | 594 |
| 31 | Me | Me | Me | H | H | Me | Et | 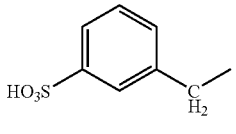 | p | 588 |
| 32 | Me | Me | Me | H | H | Me | Et | 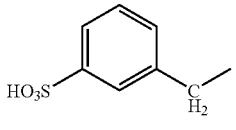 | p | 590 |
| 33 | Me | i-Pr | H | H | H | Me | Et | 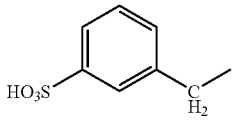 | p | 589 |
| 34 | Me | i-Pr | H | H | H | H | Et | 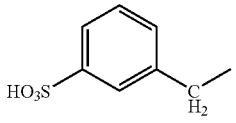 | p | 588 |
| 35 | Me | i-Pr | H | Me | Me | H | Et | 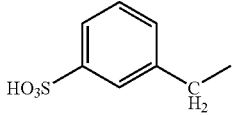 | p | 593 |
| 36 | Me | i-Pr | H | H | Me | H | Et | 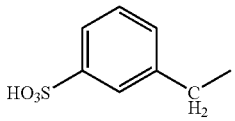 | p | 591 |

-continued
| Example | R₁ | R₂ | R₃ | R₄ | R₅ | R₆ | R₇ | R₈ | Position | λ$_{max}$ |
|---|---|---|---|---|---|---|---|---|---|---|
| 37 | Me | i-Pr | H | Me | H | H | Et | 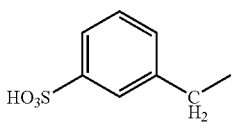 | p | 592 |
| 38 | Me | i-Pr | H | Me | H | H | n-Pr | 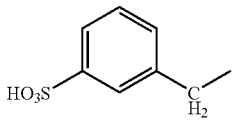 | p | 596 |
| 39 | Me | i-Pr | H | H | H | H | Me | 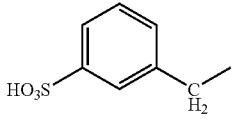 | p | 589 |
| 40 | i-Pr | i-Pr | H | H | H | H | Et | 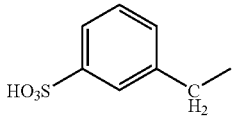 | p | 587 |
| 41 | i-Pr | i-Pr | H | H | H | Me | Et | 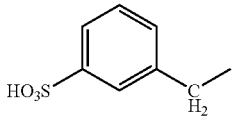 | p | 586 |
| 42 | i-Pr | i-Pr | H | H | H | H | Et | 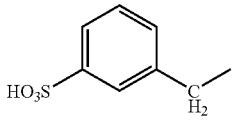 | m | 589 |
| 43 | i-Pr | i-Pr | H | H | Me | H | Et | 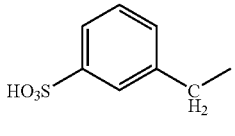 | p | 592 |
| 44 | i-Pr | i-Pr | H | Me | Me | Me | Et | 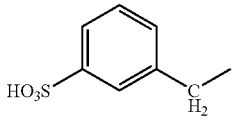 | p | 595 |
| 45 | i-Pr | i-Pr | H | Me | Me | Me | Et | 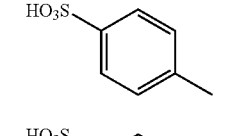 | p | 594 |
| 46 | i-Pr | i-Pr | H | H | H | Me | Et | 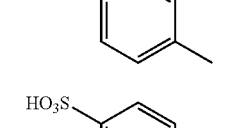 | p | 590 |
| 47 | i-Pr | i-Pr | H | Me | Me | H | Et | 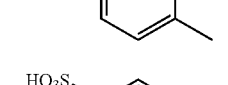 | p | 592 |
| 48 | Et | Et | H | Me | Me | Me | Et | 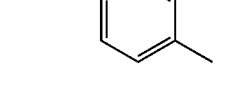 | p | 593 |

-continued

| Example | R$_1$ | R$_2$ | R$_3$ | R$_4$ | R$_5$ | R$_6$ | R$_7$ | R$_8$ | Position | $\lambda_{max}$ |
|---|---|---|---|---|---|---|---|---|---|---|
| 49 | Et | Et | H | H | H | Me | Et | HO$_3$S—C$_6$H$_4$—CH$_3$ | p | 588 |
| 50 | Et | Et | H | Me | Me | H | Et | HO$_3$S—C$_6$H$_4$—CH$_3$ | p | 591 |
| 51 | Me | Me | Me | Me | Me | Me | Et | HO$_3$S—C$_6$H$_4$—CH$_3$ | p | 590 |
| 52 | Me | Me | Me | H | H | Me | Et | HO$_3$S—C$_6$H$_4$—CH$_3$ | p | 589 |
| 53 | Me | Me | Me | H | H | H | Et | HO$_3$S—C$_6$H$_4$—CH$_3$ | m | 586 |

USE EXAMPLE A

A dyebath at 40° C., consisting of 2000 parts of water, 1 part of a weakly cation-active levelling agent which is based on an ethoxylated aminopropyl fatty acid amide and which has affinity for dye, 0.25 part of the dye of Preparation Example 1 and adjusted to pH 5 with 1-2 parts of 40% acetic acid is entered with 100 parts of nylon-6 fabric. After 10 minutes at 40° C., the dyebath is heated to 98° C. at a rate of 1° C. per minute and then left at the boil for 45-60 minutes. Thereafter it is cooled down to 70° C. over 15 minutes. The dyeing is removed from the bath, rinsed with hot and then with cold water and dried. The result obtained is a blue polyamide dyeing possessing good light and wet fastnesses.

USE EXAMPLE B

A dyebath at 40° C., consisting of 2000 parts of water, 1 part of a weakly cation-active levelling agent which is based on an ethoxylated aminopropyl fatty acid amide and which has affinity for dye, 0.3 part of the dye of Preparation Example 1 and adjusted to pH 5.5 with 1-2 parts of 40% acetic acid is entered with 100 parts of nylon-6,6 fabric. After 10 minutes at 40° C., the dyebath is heated to 120° C. at a rate of 1.5° C. per minute and then left at this temperature for 15-25 minutes. Thereafter it is cooled down to 70° C. over 25 minutes. The dyeing is removed from the dyebath, rinsed with hot and then with cold water and dried. The result obtained is a blue polyamide dyeing with good levelness and having good light and wet fastnesses.

USE EXAMPLE C

A dyebath at 40° C., consisting of 4000 parts of water, 1 part of a weakly amphoteric levelling agent which is based on a sulphated, ethoxylated fatty acid amide and which has affinity for dye, 0.4 part of the dye of Preparation Example 1 and adjusted to pH 5 with 1-2 parts of 40% acetic acid is entered with 100 parts of wool fabric. After 10 minutes at 40° C., the dyebath is heated to boiling at a rate of 1° C. per minute and then left at the boil for 40-60 minutes. Thereafter it is cooled down to 70° C. over 20 minutes. The dyeing is removed from the bath, rinsed with hot and then with cold water and dried. The result obtained is a blue wool dyeing possessing good light and wet fastnesses.

USE EXAMPLE D 100 parts of a woven nylon-6 material are padded with a 50° C. liquor consisting of

| | | |
|---|---|---|
| 40 | parts | of the dye of Preparation Example 1, |
| 100 | parts | of urea, |
| 20 | parts | of a nonionic solubilizer based on butyldiglycol, |
| 15-20 | parts | of acetic acid (to adjust the pH to 4), |
| 10 | parts | of a weakly cation-active levelling agent which is based on an ethoxylated aminopropyl fatty acid amide and has affinity for dye, and |
| 810-815 | parts | of water (to make up to 1000 parts of padding liquor). |

The material thus impregnated is rolled up and left to dwell in a steaming chamber under saturated steam conditions at 85-98° C. for 3-6 hours for fixation. The dyeing is then rinsed with hot and cold water and dried. The result obtained is a blue nylon dyeing having good levelness in the piece and good light and wet fastnesses.

USE EXAMPLE E

A textile cut pile sheet material composed of nylon-6 and having a synthetic base fabric is padded with a liquor containing per 1000 parts

| | |
|---|---|
| 1 part | of dye of Preparation Example 1 |
| 4 parts | of a commercially available thickener based on carob flour ether |

-continued 2 parts of a nonionic ethylene oxide adduct of a higher alkylphenol
1 part of 60% acetic acid.

This is followed by printing with a paste which per 1000 parts contains the following components:

20 parts of commercially available alkoxylated fatty alkylamine (displace product)
20 parts of a commercially available thickener based on carob flour ether.

The print is fixed for 6 minutes in saturated steam at 100° C., rinsed and dried. The result obtained is a level-coloured cover material having a blue and white pattern.

USE EXAMPLE F

A dyebath at 40° C. consisting of 2000 parts of water, 1 part of a weakly cation-active levelling agent which is based on an ethoxylated aminopropyl fatty acid amide and has affinity for dye, 0.2 part of the dye of Example 8 of WO2002/46318, 1.5 parts of a commercially available preparation of C.I. Acid Yellow 236 (Nylosan Yellow F-L) and 0.5 part of the blue dye of Preparation Example 1 of this patent application which is adjusted to pH 5 with 1-2 parts of 40% acetic acid is entered with 100 parts of woven nylon-6,6 fabric. After 10 minutes at 40° C., the dyebath is heated to 98° C. at a rate of 1° C. per minute and then left at the boil for 45 to 60 minutes. This is followed by cooling down to 70° C. over 15 minutes. The dyeing is removed from the bath, rinsed with hot and then with cold water and dried. The result obtained is a level grey polyamide dyeing having good light and wet fastnesses.

USE EXAMPLE G 100 parts of a chrome-tanned and synthetically retanned shave-moist grain leather are dyed for 30 minutes in a bath of 300 parts of water and 2 parts of the dye of Preparation Example 1 at 55° C. After addition of 4 parts of a 60% emulsion of a sulphited fish oil, the leather is fatliquored for 45 minutes. It is then acidified with 8.5% formic acid and milled for 10 minutes (final pH in the bath 3.5-4.0). The leather is then rinsed, allowed to drip dry and finished as usual. The result obtained is a leather dyed in a level clear blue hue with good fastnesses.

Use Examples A to G can also be carried out with dyes 2 to 53 with similar results.

USE EXAMPLE H 3 parts of the dye of Preparation Example 3 are dissolved in 82 parts of demineralized water and 15 parts of diethylene glycol at 60° C. Cooling down to room temperature gives a blue printing ink which is very highly suitable for ink jet printing on paper or polyamide and wool textiles.

Use Example H can also be carried out with dyes 1 or 2 and 4 to 53 with similar results.

USE EXAMPLE I

A dyebath consisting of 1000 parts of water, 80 parts of calcined Glauber salt, 1 part of sodium nitrobenzene-3-sulphonate and 1 part of dye from Example 79 is heated to 80° C. in the course of 10 minutes. Then, 100 parts of mercerized cotton are added. This is followed by dyeing at 80° C. for 5 minutes and then heating to 95° C. in the course of 15 minutes. After 10 minutes at 95° C., 3 parts of sodium carbonate are added, followed by a further 7 parts of sodium carbonate after 20 minutes and another 10 parts of sodium carbonate after 30 minutes at 95° C. Dyeing is subsequently continued at 95° C. for 60 minutes. The dyed material is then removed from the dyebath and rinsed in running demineralized water for 3 minutes. This is followed by two washes for 10 minutes in 5000 parts of boiling demineralized water at a time and subsequent rinsing in running demineralized water at 60° C. for 3 minutes and with cold tap water for one minute. Drying leaves a brilliant blue cotton dyeing having good fastnesses.

USE EXAMPLE J 0.2 part of the dye of Preparation Example 1 is dissolved in 100 parts of hot water and the solution is cooled down to room temperature. This solution is added to 100 parts of chemically bleached sulphite pulp beaten in 2000 parts of water in a Hollander. After 15 minutes of commixing the stuff is sized with resin size and aluminium sulphate in a conventional manner. Paper produced from this stuff has a blue shade with good wet fastnesses.

Use Examples I and J can also be carried out with dyes 2 to 53 with similar results.

The invention claimed is:
1. A compound of formula (I)

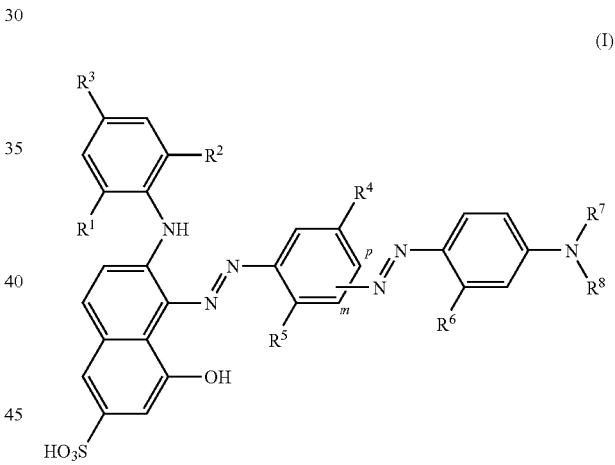

wherein
R$^1$ and R$^2$ are independently selected from the group consisting of unsubstituted unbranched C$_{1-6}$alkyl, unsubstituted branched C$_{3-6}$alkyl, substituted unbranched C$_{1-6}$alkyl, and substituted branched C$_{3-6}$alkyl,
R$^3$ is selected from the group consisting of hydrogen, unsubstituted unbranched C$_{1-6}$alkyl, unsubstituted branched C$_{3-6}$alkyl, substituted unbranched C$_{1-6}$alkyl, and substituted branched C$_{3-6}$alkyl,
R$^4$ and R$^5$ are independently selected from the group consisting of hydrogen, unsubstituted unbranched C$_{1-6}$alkyl, unsubstituted branched C$_{3-6}$alkyl, substituted unbranched C$_{1-6}$alkyl, substituted branched C$_{3-6}$alkyl, and halogen,
R$^6$ is selected from the group consisting of hydrogen, unsubstituted unbranched C$_{1-6}$alkyl, unsubstituted branched C$_{3-6}$alkyl, substituted unbranched C$_{1-6}$alkyl, substituted branched C$_{3-6}$alkyl, unsubstituted unbranched C$_{1-6}$alkoxy, unsubstituted branched C$_{3-6}$alkoxy, substituted unbranched C$_{1-6}$alkoxy, substituted branched C$_{3-6}$alkoxy, halogen, —NHCO—(C$_{1-6}$alkyl) with an unbranched C$_{1-6}$alkyl group, which is substituted or unsubstituted, —NHCO—(C$_{3-6}$alkyl) with a branched C$_{3-6}$alkyl group, which is substituted or unsubstituted, and —NHCONH$_2$, R$^7$ and R$^8$ are independently selected from the group consisting of unsubstituted unbranched C$_{1-6}$alkyl, unsubstituted branched C$_{3-6}$alkyl, substituted unbranched C$_{1-6}$alkyl, substituted branched C$_{3-6}$alkyl, aryl, and —(CH$_2$)$_n$-aryl where n=1, 2, 3 or 4.

2. A compound according to claim 1 wherein

R$^1$ and R$^2$ are independently selected from the group consisting of unsubstituted unbranched C$_{1-6}$alkyl, unsubstituted branched C$_{3-6}$alkyl, substituted unbranched C$_{1-6}$alkyl, and substituted branched C$_{3-6}$alkyl, R$^3$ is selected from the group consisting of hydrogen, unsubstituted unbranched C$_{1-6}$alkyl, unsubstituted branched C$_{3-6}$alkyl, substituted unbranched C$_{1-6}$alkyl, and substituted branched C$_{3-6}$alkyl, R$^4$ and R$^5$ are independently selected from the group consisting of hydrogen, unsubstituted unbranched C$_{1-6}$alkyl, unsubstituted branched C$_{3-6}$alkyl, substituted unbranched C$_{1-6}$alkyl, substituted branched C$_{3-6}$alkyl, and halogen, R$^6$ is selected from the group consisting of hydrogen, unsubstituted unbranched C$_{1-6}$alkyl, unsubstituted branched C$_{3-6}$alkyl, substituted unbranched C$_{1-6}$alkyl, substituted branched C$_{3-6}$alkyl, unsubstituted unbranched C$_{1-6}$alkyl, substituted branched C$_3$-C$_6$alkyl, unsubstituted unbranched C$_{1-6}$alkoxy, unsubstituted branched C$_{3-6}$alkoxy, and substituted unbranched C$_{1-6}$alkoxy, R$^7$ is selected from the group consisting of unsubstituted unbranched C$_{1-6}$alkyl, unsubstituted branched C$_{3-6}$alkyl, substituted unbranched C$_{1-6}$alkyl, and substituted branched C$_{3-6}$alkyl, R$^8$ is aryl or —(CH$_2$)$_n$-aryl where n=1, 2, 3 or 4.

3. A compound according to claim 1 wherein the compound of the formula (I) is substituted with at least one anionic substituent.

4. A compound according to claim 3 wherein the compound of the formula (I) is substituted with at least one sulpho group.

5. A process for preparing a compound of formula (I) according to claim 1, comprising the steps of: diazotizing and coupling the amine functions of the compound of the formula (II)

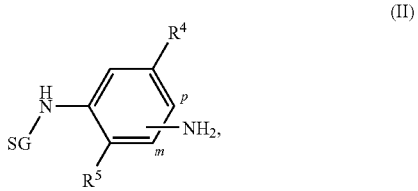

(II)

where SG is a protective group, onto one equivalent of a compound of the formula (III)

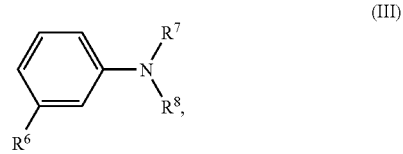

(III)

subsequently removing the protective group SG to produce an amine of the formula (IV)

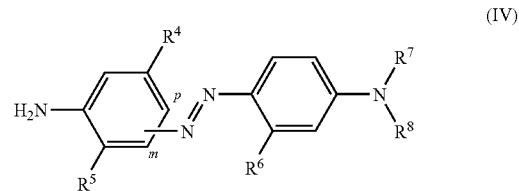

(IV)

and diazotizing and coupling the amine of the formula (IV) at acidic pH onto one equivalent of a compound of the formula (V)

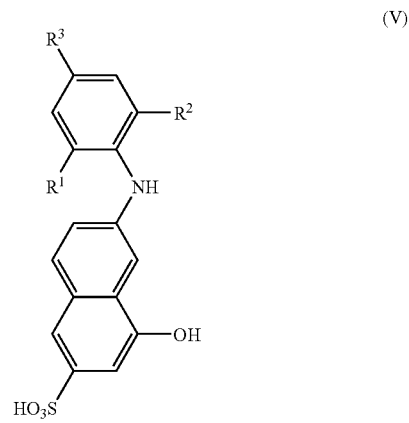

(V)

where the substituents are each as defined above.

6. A process for dyeing and/or printing an organic substrate comprising the step of contacting the organic substrate with at least one compound according to claim 1.

7. A process for dyeing and/or printing a wool, silk and/or a synthetic polyamide substrate, comprising the step of contacting the wool, silk and/or synthetic polyamide substrate with at least one compound according to claim 1.

8. A process for preparing a printing ink for the InkJet process comprising the step of adding at least one compound according to claim 1 to at least one additional inkjet ink component.

9. A process for preparing a compound of formula (I) according to claim 1, comprising the steps of:

diazotizing and coupling at acidic pH the compound of the formula (II')

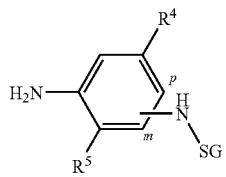

wherein SG is a protective group, onto one equivalent of a compound of the formula (V)

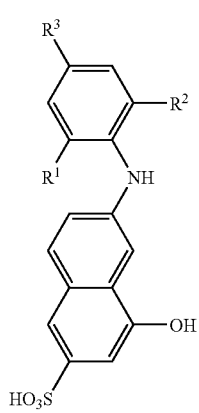

subsequently removing the protective group SG to produce the amine of the formula (IV')

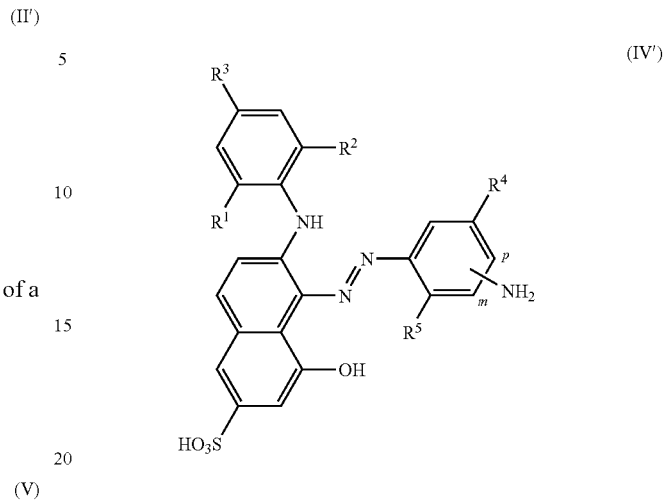

and diazotizing and coupling the amine of the formula (IV') onto one equivalent of a compound of the formula (III)

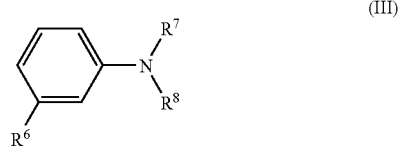

where the substituents are each as defined above.

10. An organic substrate dyed and/or printed by a process according to claim 6.

11. A wool, silk and/or synthetic polyamide substrate dyed and/or printed by a process according to claim 7.

12. An inkjet ink comprising at least one compound according to claim 1.

\* \* \* \* \*